(12) United States Patent
Allen et al.

(10) Patent No.: US 7,136,386 B2
(45) Date of Patent: Nov. 14, 2006

(54) VIRTUAL PRIVATE NETWORK OVER ASYNCHRONOUS TRANSFER MODE

(75) Inventors: Keith Joseph Allen, Austin, TX (US); Weijing Chen, Austin, TX (US); Anna Salguero, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 1110 days.

(21) Appl. No.: 09/907,606

(22) Filed: Jul. 19, 2001

(65) Prior Publication Data

US 2003/0016676 A1 Jan. 23, 2003

(51) Int. Cl.
*H04L 12/28* (2006.01)

(52) U.S. Cl. .............. 370/395.5; 370/395.52; 370/401

(58) Field of Classification Search .......... 370/395.1, 370/466, 465, 467, 397, 395.52, 395.54, 370/395.5, 401
See application file for complete search history.

(56) References Cited

U.S. PATENT DOCUMENTS

| | | | |
|---|---|---|---|
| 4,494,231 | A | 1/1985 | Slawy et al. |
| 5,051,982 | A | 9/1991 | Brown et al. |
| 5,274,643 | A | 12/1993 | Fisk |
| 5,490,141 | A | 2/1996 | Lai et al. |
| 5,610,969 | A | 3/1997 | McHenry et al. |
| 5,764,645 | A | 6/1998 | Bernet et al. |
| 5,828,838 | A | 10/1998 | Downs et al. |
| 5,842,040 | A | 11/1998 | Hughes et al. |

(Continued)

FOREIGN PATENT DOCUMENTS

| | | |
|---|---|---|
| EP | 0961519 | 12/1999 |
| JP | 8-186580 | 7/1996 |
| WO | 98/26627 | 6/1998 |
| WO | 98/36612 | 8/1998 |

(Continued)

OTHER PUBLICATIONS

Zhou, S., et al., "Efficient Location Management for Hybrid Wireless ATM Networks; Architecture and Performance Analysis," 1999, IEEE, pp. 378-381.

(Continued)

*Primary Examiner*—Andrew C. Lee
(74) *Attorney, Agent, or Firm*—Greenblum & Bernstein, P.L.C.

(57) ABSTRACT

A communications network and method enable broadband service subscribers to dynamically select broadband service destinations they wish to access from subscriber customer premises equipment. The communications network is an ATM network including a plurality of ATM switches. The network also includes at least one directory server connected to the ATM network, at least one fiber terminating device connected to the at least one directory server, and at least one broadband destination connected to the ATM network. Furthermore, the subscribers' customer premise equipment is connected to the at least one fiber terminating device. The method includes receiving a session request, which identifies a destination, in the at least one service gateway, wherein the session request is transmitted over a broadband connection using an Internet protocol. Next, using the at least one service gateway, an ATM network address of the destination from the at least one directory server is retrieved. Then an SVC is launched over the ATM network from the at least one service gateway to connect the subscriber to the ATM network address. Finally, the subsequent packets are forwarded to the destination over the ATM SVC connection.

33 Claims, 8 Drawing Sheets

Termination of Connections

U.S. PATENT DOCUMENTS

| | | | |
|---|---|---|---|
| 5,892,924 | A | 4/1999 | Lyon et al. |
| 5,905,726 | A * | 5/1999 | Gupta .................... 370/390 |
| 5,920,562 | A | 7/1999 | Christie et al. |
| 5,923,740 | A | 7/1999 | Ito et al. |
| 5,943,337 | A | 8/1999 | Sasagawa |
| 5,953,338 | A | 9/1999 | Ma et al. |
| 5,956,334 | A | 9/1999 | Chu et al. |
| 5,970,064 | A | 10/1999 | Clark et al. |
| 5,974,048 | A | 10/1999 | Godse et al. |
| 5,991,301 | A | 11/1999 | Christie |
| 5,999,514 | A | 12/1999 | Kato |
| 5,999,518 | A | 12/1999 | Nattkemper et al. |
| 5,999,532 | A | 12/1999 | Terasaki |
| 6,028,924 | A | 2/2000 | Ram et al. |
| 6,028,933 | A | 2/2000 | Heer et al. |
| 6,031,840 | A | 2/2000 | Christie et al. |
| 6,032,118 | A | 2/2000 | Tello et al. |
| 6,035,405 | A | 3/2000 | Gage et al. |
| 6,041,056 | A * | 3/2000 | Bigham et al. ........ 370/395.64 |
| 6,041,109 | A | 3/2000 | Cardy et al. |
| 6,073,160 | A | 6/2000 | Grantham et al. |
| 6,081,518 | A | 6/2000 | Bowman-Amuah |
| 6,094,437 | A | 7/2000 | Loehndorf, Jr. et al. |
| 6,097,720 | A | 8/2000 | Araujo et al. |
| 6,097,722 | A | 8/2000 | Graham et al. |
| 6,108,350 | A | 8/2000 | Araujo et al. |
| 6,112,245 | A | 8/2000 | Araujo et al. |
| 6,118,785 | A | 9/2000 | Araujo et al. |
| 6,137,793 | A | 10/2000 | Gorman et al. |
| 6,141,339 | A | 10/2000 | Kaplan et al. |
| 6,148,074 | A | 11/2000 | Miloslavsky et al. |
| 6,157,648 | A | 12/2000 | Voit et al. |
| 6,167,432 | A | 12/2000 | Jiang |
| 6,169,735 | B1 | 1/2001 | Allen, Jr. et al. |
| 6,181,693 | B1 | 1/2001 | Maresca |
| 6,222,842 | B1 | 4/2001 | Sasyan et al. |
| 6,229,810 | B1 | 5/2001 | Gerszberg et al. |
| 6,252,857 | B1 | 6/2001 | Fendick et al. |
| 6,289,001 | B1 | 9/2001 | Smyk |
| 6,292,495 | B1 | 9/2001 | Von Hammerstein et al. |
| 6,298,043 | B1 | 10/2001 | Mauger et al. |
| 6,345,051 | B1 | 2/2002 | Gupta et al. |
| 6,366,577 | B1 | 4/2002 | Donovan |
| 6,366,948 | B1 | 4/2002 | Teibel |
| 6,373,930 | B1 | 4/2002 | McConnell et al. |
| 6,400,716 | B1 | 6/2002 | Munakata et al. |
| 6,434,612 | B1 | 8/2002 | Hughes et al. |
| 6,473,427 | B1 | 10/2002 | Brodigan |
| 6,473,430 | B1 | 10/2002 | Sreedharan et al. |
| 6,529,479 | B1 | 3/2003 | Suzuki |
| 6,542,475 | B1 | 4/2003 | Bala et al. |
| 6,563,835 | B1 | 5/2003 | Chen |
| 6,597,689 | B1 | 7/2003 | Chiu et al. |
| 6,618,381 | B1 | 9/2003 | Miyamoto et al. |
| 6,621,793 | B1 | 9/2003 | Widegren et al. |
| 6,633,569 | B1 | 10/2003 | Hemmady |
| 6,636,516 | B1 * | 10/2003 | Yamano ................ 370/395.52 |
| 6,741,585 | B1 * | 5/2004 | Munoz et al. .............. 370/352 |
| 6,801,508 | B1 | 10/2004 | Lim |
| 6,804,247 | B1 * | 10/2004 | Sasyan et al. .............. 370/397 |
| 6,807,174 | B1 * | 10/2004 | Bernstein et al. .......... 370/389 |
| 6,822,962 | B1 * | 11/2004 | Noake et al. ............ 370/395.2 |
| 6,842,449 | B1 | 1/2005 | Hardjono |
| 6,859,457 | B1 * | 2/2005 | Tanaka .................... 370/395.2 |
| 6,870,841 | B1 * | 3/2005 | Brown et al. .............. 370/389 |
| 6,928,167 | B1 * | 8/2005 | Maeda et al. ............... 380/285 |
| 6,937,595 | B1 * | 8/2005 | Barzegar et al. ........... 370/352 |
| 6,937,598 | B1 * | 8/2005 | Hagirahim et al. ......... 370/356 |
| 2001/0026553 | A1 | 10/2001 | Gallant et al. |
| 2002/0010866 | A1 | 1/2002 | McCullough et al. |
| 2002/0024954 | A1 | 2/2002 | Cunetto |
| 2002/0071427 | A1 | 6/2002 | Dickson |
| 2002/0126674 | A1 | 9/2002 | Hemmady et al. |
| 2002/0143959 | A1 | 10/2002 | El-Baze et al. |
| 2002/0150110 | A1 | 10/2002 | Inbar et al. |
| 2002/0156914 | A1 | 10/2002 | Lo et al. |
| 2003/0031184 | A1 | 2/2003 | Cunetto et al. |
| 2003/0128698 | A1 | 7/2003 | Darland et al. |
| 2003/0133454 | A1 | 7/2003 | Gallant et al. |
| 2004/0107238 | A1 | 6/2004 | Orton et al. |

FOREIGN PATENT DOCUMENTS

| | | |
|---|---|---|
| WO | 98/37727 | 8/1998 |
| WO | 99/30530 | 6/1999 |
| WO | 00/62496 | 10/2000 |

OTHER PUBLICATIONS

Reece, P.W. et al., "The Broadband Call Control Demonstrator—A Platform for ITU-T, Davic and Tina-C Implementations," BT Technology Journal, vol. 16, No. 2, pp. 155-168, Apr. 1, 1998.

English Language Abstract of JP 8-186580.

Printout of a website entitled "Abstract—Security for Asynchronous Transfer Mode (ATM) Networks", WPI Department of Electrical and Computer Engineering, last modified on Apr. 23, 1996.

Winkelstein, Printout of a website entitled "ATM Security VPN Case Study", Celotek Corporation.

Riggs, Brian, "Tecos to Open ATM SVC Floodgate", published Mar., 1997, pp. 1-3, <www.lantimes.com>.

"Voice Over ATM Switched Virtual Circuits on the Cisco MC3810", pp. 1-5, www.cisco.com>.

Taylor, Steve et al. "Do You Need Frame-to-ATM SVC", by, published Jun., 2000, pp. 1-2, <www.nwfusion.com>.

"Ipsilon's General Switch Management Protocol Specification: The Internet Society, 1998", version 2, by Newman et al., The Internet Society, Network Working Group, 1998, pp. 1-79.

Marshall, W. et al., "SIP Extensions for Media Authorization," dated Feb. 2001, pp. 1-23, <draft-ietf-sip-call-auth-01.txt>.

Marshall, W. et al., "SIP Extensions for Media Authorization,", dated Nov. 2000, pp. 1-25, <draft-ietf-sip-call-auth-00.txt>.

Clark et al., "Bandwidth-on-Demand Networks—A Solution to Peer-to-Peer File Sharing", BT Technology Journal, vol. 20, No. 1, Jan., 2002, pp. 53-63.

Loeser et al., "Distributed Video on Demand Services on Peer to Peer Basis", 1st International Workshop on Real Time LANs in the Internet Age, Jun. 18, 2002, pp. 1-4, <http://www.hurray.isep.ipp.pt/rtlia2002/full_papers/20$_{13}$rtlia.pdf>.

"Efficient Routing of Packets for Multi-Media, Peer to Peer Applications", IBM Technical Disclosure Bulletin, May, 1994, pp. 459-460.

"Method for the Conversion of Multimedia Streams to Packet Streams", IBM Technical Disclosure Bulletin, Jun., 1994, pp. 95-98.

Bauer et al., "The Personal Router", The Eight ACM International Conference on Mobile Computing and Networking, Sep. 23-28, 2002, p. 1.

"User Interface Design for Videoconferencing Entries", IBM Technical Disclosure Bulletin, Apr., 1994, pp. 539-540.

Clark et al., "The Personal Router Whitepaper", MIT Laboratory for Computer Science, Version 2.0, Mar., 2001, <http://ana.lcs.mit.edu/anaweb/PDF/PR_whitepaper_v2.pdf>.

cnfport: Configure Port—PXMIE, Cisco MGX 8830, MGX 8850 (PXM45 and PXMIE), and MGX 8950 Command Reference, Release 3, Part No. 78-14789-01 Rev. B0, Jan. 2003, p. 2-299.

"dspport: Display Port—PXMIE", Cisco MGX 8830, MGX 8850 (PXM45 and PXMIE), and MGX 8950 Command Reference, Release 3, Part No. 78-14789-01 Rev. B0, Jan. 2003, p. 2-749.

Yager, C. "White Paper: Cisco Asymmetric Digital Subscriber Line Services Architecture", Cisco Systems, published on Jul. 33, 2000.

* cited by examiner

Figure 1. VPNoATM Architecture with Stand-alone Gateway

Figure 2. VPNoATM Architecture with Integrated Gateway

| Domain Name | ATM Network Address | Connection Sharing | Features | | |
|---|---|---|---|---|---|
| | | | Exclusive Session? | Security | Caller ID |
| ISP1.com | 123.456.789 | L2TP | No | Yes | Yes |
| ISP2.com | 123.456.777 | PTA | Yes | Yes | No |
| Enterprise.com | 123.456.888 | PPP | Yes | No | No |
| Video.com | 123.456.999 | none | No | No | No |
| . | . | . | . | . | . |
| . | . | . | . | . | . |
| . | . | . | . | . | . |

Figure 3. Example Directory Server Entries

*Figure 4*

*Establishing an SVC Connection*

Figure 5

*Establishing Multiple Sessions*

Figure 6

Establishing Connection Sharing

*Figure 7*

Termination of Connections

Figure 8

Call Flow Diagram

VIRTUAL PRIVATE NETWORK OVER ASYNCHRONOUS TRANSFER MODE

BACKGROUND OF THE INVENTION

1. Field of the Invention

The present invention relates to a data communications network. In particular, the present invention discloses a technique for utilizing ATM SVCs (Asynchronous Transfer Mode Switched Virtual Circuits) to enable broadband service subscribers to dynamically choose the broadband destinations they wish to access in a manner that does not cause undue administrative overhead to the network carrier or broadband destination provider.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

ADSL Transmission Unit-Remote (ATU-R)
Asynchronous Transfer Mode Switched Virtual Circuit (ATM SVC)
Customer Premises Equipment (CPE)
Internet Protocol (IP)
Internet Service Provider (ISP)
Local Area Network (LAN)
Layer 2 Tunneling Protocol (L2TP)
Lightweight Directory Access Protocol (LDAP)
Multi-Protocol Label Switching (MPLS)
Network Selection Access Point (NSAP)
Peripheral Component Interface (PCI)
Point-to-Point Protocol (PPP)
PPP Tunnel Aggregation (PTA)
Plain Old Telephone Service (POTS)
Permanent Virtual Circuit (PVC)
Switched Virtual Circuit (SVC)
Transmission Control Protocol/Internet Protocol (TCP/IP)
Service Selection Gateway (SSG)
Universal Serial Bus (USB)
Virtual Private Network Over Asynchronous Transfer Mode (VPNoATM)

3. Discussion of Background Information

Many network carriers are providing broadband access services to large numbers of subscribers using xDSL, cable modem, and other approaches. Currently, subscribers are typically connected to a single data service provider, usually an ISP, at service subscription time using a point-to-point or "nailed up" connection. Changing the destination accessed by the subscriber can only be done with administrative action on the part of the carrier.

However, network carriers are now beginning to deploy broadband service "gateways" to which broadband subscribers will be connected. These gateways are able to interpret data sent from the subscriber's terminal to the network, and dynamically connect the subscriber to their desired destination. This enables a subscriber to, for example, connect to their ISP for a session, and then switch to their employer's corporate LAN so that the subscriber may work from home.

An example of the aforementioned technology is disclosed in U.S. Pat. No. 6,141,339, which provides a communications network that includes broadband networks and a service node to facilitate communications services for an end-user. In particular, the network has the ability to implement ATM SVCs. Furthermore, the network converts POTS traffic to ATM traffic at the residence.

However, U.S. Pat. No. 6,141,339 has a major disadvantage in that it requires one connection for each destination. In other words, multiplexing or aggregation does not occur. As a result, the network is quickly overburdened with many independent connections. Furthermore, the network becomes very difficult to administer.

Another example of the aforementioned technology is provided in the reference entitled "Cisco Asymmetric Digital Subscriber Line Services Architecture" (referred to as "White Paper"). In particular, the White Paper technology recognizes the advantages of aggregation by utilizing a variety of approaches.

Similar to the approach described in U.S. Pat. No. 6,141,339, the White Paper describes schemes that rely upon static or "nailed-up" connections to each of the possible destinations a subscriber might wish to access. If the destinations only include service providers such as ISPs and video-on-demand providers, static connections are not a big problem. When enterprise data networks are added as possible destinations, however, each gateway must be connected to each destination, so the number of connections required is combinatory. In a large metro area with just a couple of dozen gateways but thousands of corporations wishing to give their employees broadband access to their networks from home, the number of connections can grow into the hundreds of thousands. Maintaining these connections as enterprises are added and removed, requires significant administrative effort on the part of the carrier.

The White Paper also discloses an approach that utilizes SVCs from CPE (customer premises equipment) to the edge of the network. In this scheme, the core of the network implements transmission of data utilizing the well-known Internet Protocol (IP) and a new standard Multi-Protocol Label Switching (MPLS). MPLS is currently an evolving Internet Engineering Task Force (IETF) standard that has not been widely deployed. Furthermore, the use of MPLS does not leverage the currently provisioned ATM networks. In addition, by launching SVCs from the CPE, the subscriber at the CPE is required to interact with a technology that many people are not familiar with.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF AN EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention removes the aforementioned disadvantages by enabling the broadband service gateway to dynamically establish a connection to the destination only when a connection is required while utilizing the presently existing ATM networks. Rather than relying upon "permanent" connections between the gateway and the destinations, "switched" connections are established using the SVC capabilities of ATM equipment. Because the gateway automatically establishes these connections when required and fewer connections are thus in place, the administrative burden of maintaining these connections is removed. However, the ability of the subscriber to dynamically choose destination is retained. Also, the way in which the subscriber communicates with the network does not change.

Furthermore, an advantage of the present invention is that it allows subscribers to utilize mainstream IP Point-to-Point Tunneling Protocol (PPP) on the edge of the communications network (i.e., at the CPE) and utilize existing ATM networks in the core of the communications network. An aspect of the present invention includes expanding the capabilities of broadband service gateways to utilize a directory server and the SVC capabilities of the ATM switches in the manner described herewith.

Another advantage of the present invention is that it removes the administrative overhead of maintaining a static connection from each gateway to each possible destination by providing a method for dynamically establishing a connection to a destination only when one is required. The subscriber continues to access the network and request sessions just as before, using PPP protocol or a protocol with similar capabilities. Also, the subscriber may continue to specify a requested destination by specifying a structured user name, as before.

In particular, the domain name supplied by the subscriber is received by the gateway and mapped to an ATM network address with the use of a directory server. If the gateway does not have an existing connection to that destination, the gateway creates a connection by launching an ATM SVC to the destination using the ATM network address retrieved from the directory server. If multiple subscribers on the same gateway seek to access the same destination, their sessions can be multiplexed onto a single switched connection using L2TP, PTA, or some other connection-sharing approach. The connection is maintained for as long as any subscriber is using it, and then can even be maintained for some additional period of time in case someone else requires it to reduce the amount of connection setup and tear down processing.

Eventually, though, inactive connections are torn down to conserve network resources. So, rather than maintaining a combinatory number of connections between the gateways and destinations, the carrier need only to provide an entry in a directory server that enables each domain name to be mapped to an ATM network address. When a new gateway is added, it need only be set up to access the directory server, where the gateway will find entries for each of the destinations the gateway will have to contact. In addition to ATM network addresses, service-related information can be stored in the directory server.

According to an aspect of the present invention, a method for enabling broadband service subscribers to dynamically access, from subscriber customer premises equipment, broadband service destinations via an ATM network is provided. The ATM network includes a plurality of ATM switches, the customer premises equipment being connected to at least one service gateway via at least one fiber terminating device, and the at least one service gateway being connected to at least one directory server. The method includes receiving a session request, which identifies a selected one of the broadband destinations, in the at least one service gateway, wherein the session request is transmitted over a broadband connection using an Internet protocol; retrieving, using the at least one service gateway, an ATM network address of the selected broadband destination from the at least one directory server; launching an SVC over the ATM network from the at least one service gateway to connect the subscriber to the ATM network address; and forwarding the session request and subsequent packets to the selected destination to establish a session over the ATM SVC connection.

According to another aspect of the present invention, when the subscriber terminates the session, the at least one service gateway tears down the ATM SVC connection. In yet another aspect of the present invention, the at least one service gateway retains the ATM SVC connection for a predetermined period of time before the ATM SVC connection is torn down.

In another aspect of the present invention, the method further includes concurrently establishing multiple sessions for one subscriber using a plurality of ATM SVC connections mapped to a plurality of different destinations. According to a further aspect of the present invention, the method further includes sharing the ATM SVC connection with a plurality of subscribers such that each subscriber has a session established to the same destination.

In another aspect of the present invention, connection sharing is established by multiplexing each of the plurality of subscribers sessions onto a single SVC connection using one of Layer 2 Tunneling Protocol and PPP Tunnel Aggregation. According to still a further aspect of the present invention, the at least one directory server is provided with a table which correlates ATM network addresses with domain names.

Other aspects of the present invention includes a table which further includes a connection sharing protocol for each domain name. Further aspects of the present invention include wherein the table further indicates whether the session is exclusive for each domain name. According to other aspects of the present invention, the table further includes whether caller I.D., for security purposes, is provided when sessions are established to the destination identified by the domain name.

According to another aspect of the present invention, the retrieving further includes querying the at least one directory server with a domain name, and receiving back the respective ATM network address, connection sharing protocol, data on whether the session is exclusive, and whether caller I.D. for security purposes is provided, for the domain name which has been queried.

According to still a further aspect of the present invention, the at least one service gateway is provided with a database which is updated each time a subscriber logs in and logs out, to internally track existing ATM SVC connections. According to another aspect of the present invention, the at least one service gateway comprises a plurality of service gateways located in different geographical regions.

In yet another aspect of the invention, the plurality of service gateways access different directory servers which are loaded with ATM network addresses for different geographical regions, thus preventing service gateways in one region from launching ATM SVCs to destinations in other regions. In another aspect of the present invention, the at least one fiber terminating device and the at least one broadband service gateway are integrated into one unit. According to still a further aspect of the present invention, the at least one fiber terminating device comprises one of a multiplexer and a cable television head-end.

Other aspects of the present invention include establishing a permanent virtual connection between the subscriber customer premise equipment and the at least one service gateway. According to other aspects of the present invention, the Internet protocol is point-to-point protocol (PPP).

According to another aspect of the present invention, a data communications network for enabling a broadband service subscriber to dynamically select at least one broadband service destination from subscriber customer premises equipment, is provided. The communications network includes an ATM network including a plurality of ATM switches; at least one fiber terminating device; at least one directory server; and at least one broadband service gateway connected to the ATM network, the at least one fiber terminating device, and the at least one directory server. The at least one service gateway receives Internet protocol packets, associated with a session request and transmitted from the customer premises equipment, via the at least one fiber terminating device, the at least one service gateway then launches an ATM SVC connection over the ATM network to connect the subscriber to the at least one broadband service destination in response to the session request from the customer premises equipment.

According to another aspect of the present invention, point-to-point protocol (PPP) is used to transmit data from the customers premise equipment to the at least one service gateway. In yet another aspect of the invention, a permanent virtual connection between the customer premises equipment and the at least one service gateway. In another aspect of the present invention, the at least one service gateway comprises a plurality of gateways located in different geographical regions.

According to still further aspects of the present invention, the plurality of gateways access different directory servers which are loaded with ATM network addresses appropriate for each different geographical region, preventing gateways in one region from launching ATM SVCs to destinations in another region. Other aspects include a permanent virtual connection established between the at least one service gateway and the at least one directory server.

According to a further aspect of the present invention, the at least one fiber terminating device and the at least one broadband service gateway are integrated into one unit. In yet another aspect of the present invention, the at least one service gateway is provided with a database which internally tracks existing ATM SVC connections.

Additionally, other aspects of the present invention include concurrently established multiple sessions for the subscriber using a plurality of ATM SVC connections mapped to a plurality of different destinations. In another aspect of the present invention, a single ATM SVC connection is shared with a plurality of subscribers such that each subscriber has a unique session established to the same destination.

According to still a further aspect of the present invention connection sharing includes multiplexing each session into a single SVC connection using one of Layer 2 Tunneling Protocol and PPP Tunnel Aggregation. Further aspects of the present invention include providing the at least one directory server with a table which correlates ATM network addresses with domain names. Further aspects of the invention includes a connection sharing protocol for each domain name in the table.

Other aspects include wherein the table further indicates whether the session is exclusive for each domain name. According to a further aspect of the present invention, the at least one broadband service gateway queries the at least one directory server with a domain name, and the at least one service gateway receives back a respective ATM network address, and connection sharing protocol data indicating whether the session is exclusive, for that respective domain name. According to a still further aspect of the present invention, the at least one fiber terminating device comprises one of a multiplexer and cable television head-end.

According to still a further aspect of the present invention, a computer readable medium storing a computer program that enables broadband service subscribers to dynamically access, from subscriber customer premises equipment, broadband service destinations via an ATM network comprising a plurality of ATM switches, the customer premises equipment being connected to at least one service gateway via at least one fiber terminating device, the at least one service gateway being connected to at least one directory server. The computer readable medium includes a source code segment that receives a session request, which identifies a selected one of the broadband destinations, in the at least one service gateway, wherein the session request is transmitted over a broadband connection using an Internet protocol; a source code segment that retrieves, using the at least one service gateway, an ATM network address of the selected broadband destination from the at least one directory server; a source code segment that launches an SVC over the ATM network from the at least one service gateway to connect the subscriber to the ATM network address; and a source code segment that forwards the session request and subsequent packets to the selected destination to establish a session over the ATM SVC connection.

Other exemplary embodiments and advantages of the present invention may be ascertained by reviewing the present disclosure and the accompanying drawings.

1. System Overview a. System Components

Figure 1:
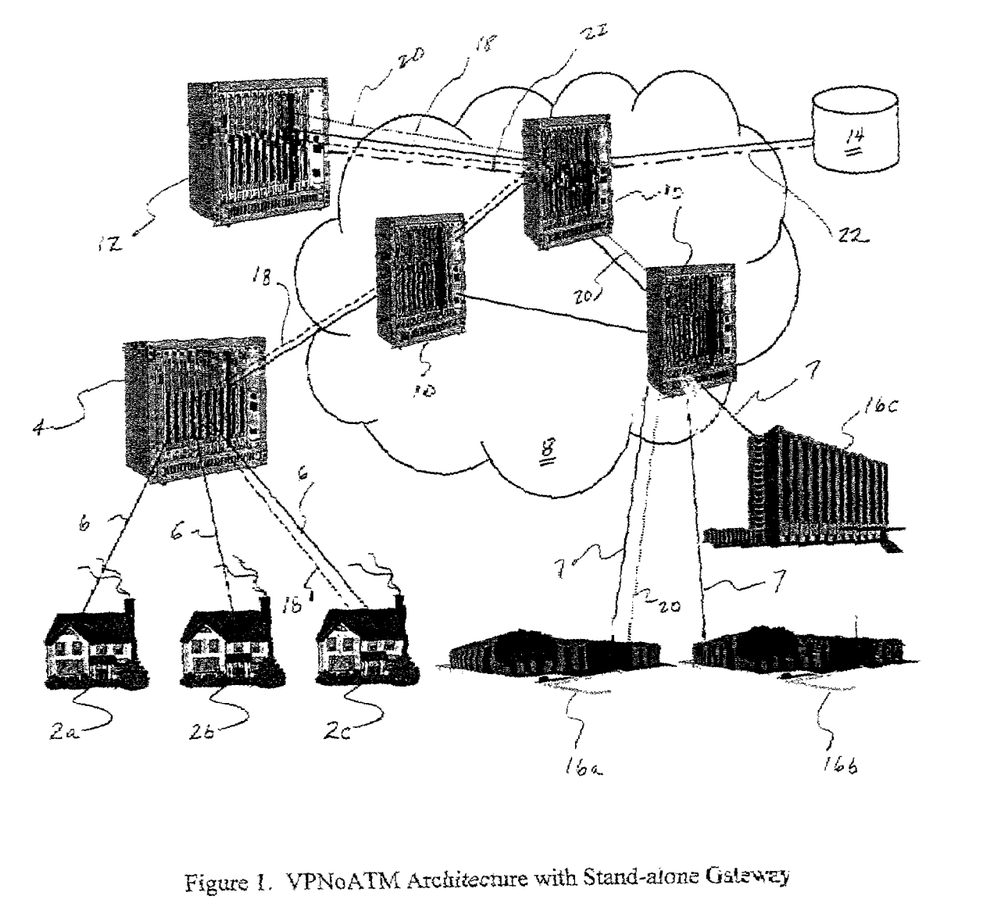
FIG. 1 is a system architecture diagram of an embodiment of the present invention which illustrates the virtual private network over asynchronous transfer mode (VPNoATM) architecture with a stand-alone gateway according to an aspect of the present invention.

FIG. 1 illustrates a first embodiment of the present invention. Broadband service subscribers 2a–c providing their own customer premises equipment (CPE), such as computers, are connected to an access multiplexer 4 in their neighborhood with high-speed access lines 6, such as xDSL. For sake of explanation, ADSL will be used throughout the remainder of the specification, however, the present invention is not limited to use of ADSL.

An ADSL modem (not shown), which utilizes Ethernet protocol or any other acceptable protocol, is utilized as an interface between the subscriber's CPE 2a–c and the ADSL access line. For instance, a customer's computer can be connected to the ADSL modem via an Ethernet cable, though USB versions of modems may also be used. The subscribers can provide their own ADSL modem, but typically the carrier provides an ADSL modem.

The access multiplexer 4 is connected to an ATM backbone network 8, including one or more ATM switches 10 that support both permanent virtual circuits (PVCs) and switched virtual circuits (SVCs). Also connected to the ATM network 8 are one or more broadband service gateways 12, one or more directory servers 14, and broadband service providers 16a–c, such as ISPs, video-on-demand providers, and enterprise data networks. The broadband service providers 16a–c terminate their connections to the ATM network 8 with an IP router or perhaps a broadband service gateway of their own (not shown). Gateways 12 in different geographical areas will access different directory servers 14 which are loaded with ATM network addresses appropriate for that area. This prevents gateways 12 in one city from launching SVCs to destinations in another city.

Figure 2:
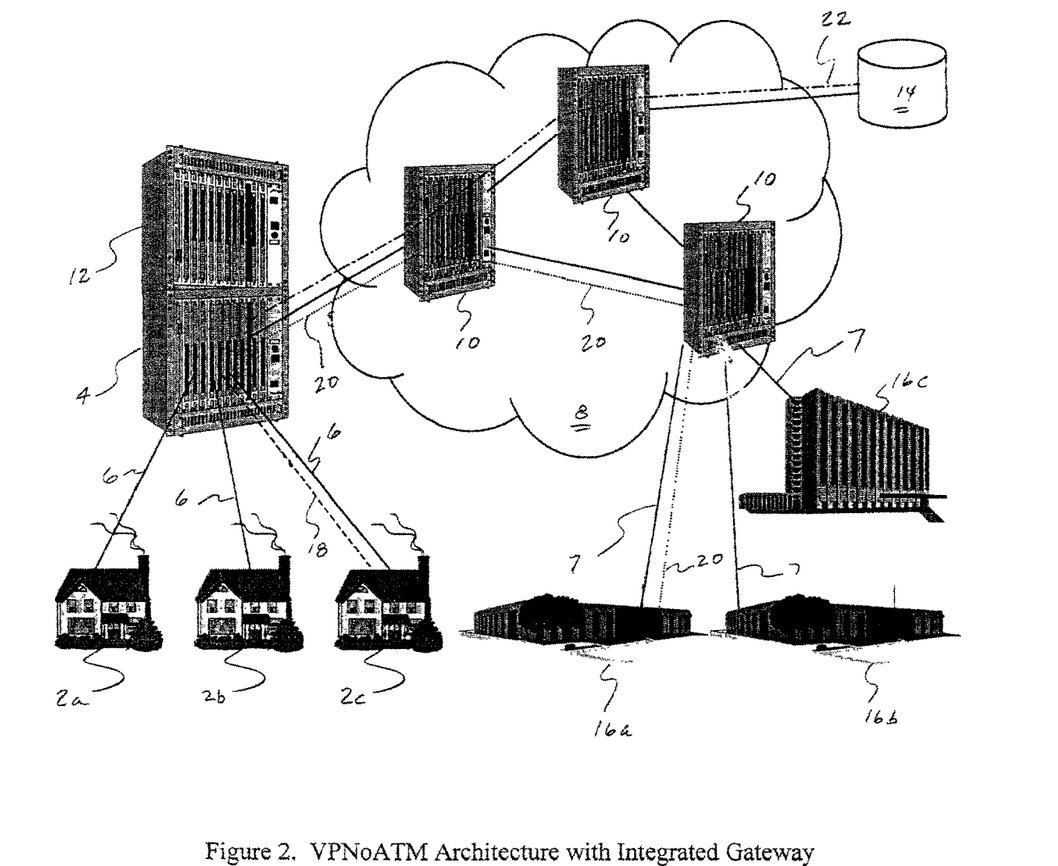
FIG. 2 is a system architecture diagram which illustrates a second embodiment of the invention including an integrated access multiplexer and broadband service gateway according to an aspect of the present invention.

While the carrier's broadband service gateway 4 is shown in FIG. 1 as a separate piece of equipment, it can be integrated with either the access multiplexer 12 or the ATM switches 10. FIG. 2 illustrates a second embodiment of the present invention in which the access multiplexer 4 and broadband service gateway 12 are integrated together.

Broadband access multiplexers 4, such the Alcatel ASAM 1000 and ASAM 7300, and ATM switches 10, such as the Alcatel 7670, Lucent GX 500 and CBX 550, capable of supporting both PVCs and SVCs are widely available. Broadband service gateways 12, such as the Nortel BSN-5000 are also available. Finally, IP routers such as the Cisco 3600, 6400, 7200 and 7500, are capable of terminating ATM SVCs are also currently available.

Directory servers 14, such as those using the Lightweight Directory Access Protocol (LDAP) and software capable of being run on a general-purpose computer are also commonly available. LDAP is a likely choice for implementation of the directory look-up function, but others could also be used. Gateway 12 will receive back the information stored in directory server 14 that is associated with the specified domain name.

b. Addition of Components to the Network and Dedicated PVC's

Establishing service for each new subscriber requires provisioning a broadband access line 6. It also entails creating a permanent virtual connection (PVC) 18 from CPE 2a–c to broadband service gateway 12 for each subscriber. The ADSL modem on each subscriber's premises will then take the data traffic from the subscriber, insert it into ATM cells, and send the ATM cells across the PVC established for that subscriber to service gateway 12. It will also perform the opposite for data coming back from service gateway 12.

To add a new broadband service gateway 12 to the communications network, gateway 12 must be connected to ATM network 8, and provisioned with ATM SVC capabilities. Then, gateway 12 may be loaded with data it needs to access directory server 14 for the purpose of resolving domain names. It should be noted that for inter-component communications, broadband service gateway 12 is also connected to directory server 14 over a PVC connection 22. Alternatively, the connection between gateway 12 and directory server 14 may be an Ethernet connection or the like.

To add a new destination 16a–c, the destination subscribes to the service with the carrier and is provisioned with an ATM access line 7 (from FIGS. 1 and 2) capable of supporting SVCs. As part of this process, an ATM network address will be assigned to the destination. The destination 16a–c also provides the carrier with a domain name that the destination wishes to have associated with it, and the domain name will be matched to the assigned ATM network address. Also, a database in directory server 14 will be updated. The directory server database will be described in further detail in the following section. Other service parameters negotiated with the destination can be included and will also be discussed later in the specification.

One advantage of integrating gateway 12 into the access multiplexer 4 (from FIG. 2) is that the proximity between gateway 12 and multiplexer 4 greatly simplifies establishing the dedicated PVC communications link 18 required between both components. In other words, a portion of the dedicated PVC 18 between multiplexer 4 and gateway 12 is eliminated. As a result, for each subscriber 2a–c the required PVC connection 18 is greatly simplified and can be replaced with internal connections within the integrated multiplexer 4 and gateway 12.

c. Directory Server Database, Gateway Database & Other Features

Figure 3:
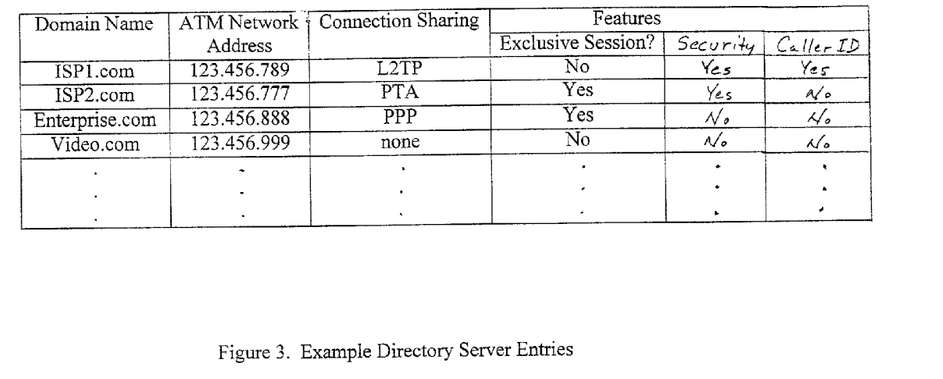
FIG. 3 is a table which depicts an example of entries provided in the directory server according to an aspect of the present invention.

Each directory server 14 is provided with a database storing a table, an example of which is illustrated in FIG. 3. The database is loaded with a variety of mapping information such as the destination domain name of each ISP or enterprise, an ATM network address for each destination domain name, and information for other service related features, such as "Connection Sharing" and "Exclusive Sessions". For example, a multiplexing scheme to be used to multiplex multiple subscriber sessions to ATM SVC connection 20 (from FIGS. 1 and 2) can be included, as well as an indication that multiplexing is not supported. These features will be discussed in greater detail later in the specification.

It is noted that the information in directory server's 14 database is somewhat static and not subject to be changed often. Nevertheless, the data in directory server's 14 database will be updated when gateway 12 or destination 16a–c is added or dropped from the communications network. In particular, the service carrier will create a new row in the database within directory server 14. This row may include the domain name as the key, the ATM network address assigned to the destination, and whether connection sharing, exclusive sessions, and other features are allowed.

Gateway 12 is also provided with its own database, which internally tracks ATM SVC connections already in place, to assist in tracking how many users are on an established ATM SVC connection 20. Tracking is accomplished by updating the database in gateway 12 each time a user logs in and out. As compared to the database in directory server 14 which is considered somewhat static, the database in gateway 12 tracks real-time session activity, which is inherently more dynamic.

Another feature can be provided wherein gateway 12 forwards to ISP or enterprise 16a–c, information about the subscriber. Thus, information can be provided as a security feature which functions similar to caller ID (see FIG. 3). This feature is particularly suited for providing information to ISPs or enterprises to prevent unwanted logins from unauthorized users. For example, ADSL line numbers could be forwarded to destination 16a–c and the destinations could determine whether or not a current incoming call matches the authorized ADSL line. This feature is disclosed in further detail in U.S. Application, entitled "Method and System for Broadband Network Access", filed on Apr. 27, 2001 by Allen et al., the disclosure of which is expressly incorporated by reference herein in its entirety.

2. System Operation

FIGS. 4–7 are a flow diagrams which illustrate an exemplary manner in which the virtual private network over asynchronous transfer mode (VPNoATM) functions.

a. Establishing an ATM SVC Connection

Figure 4:
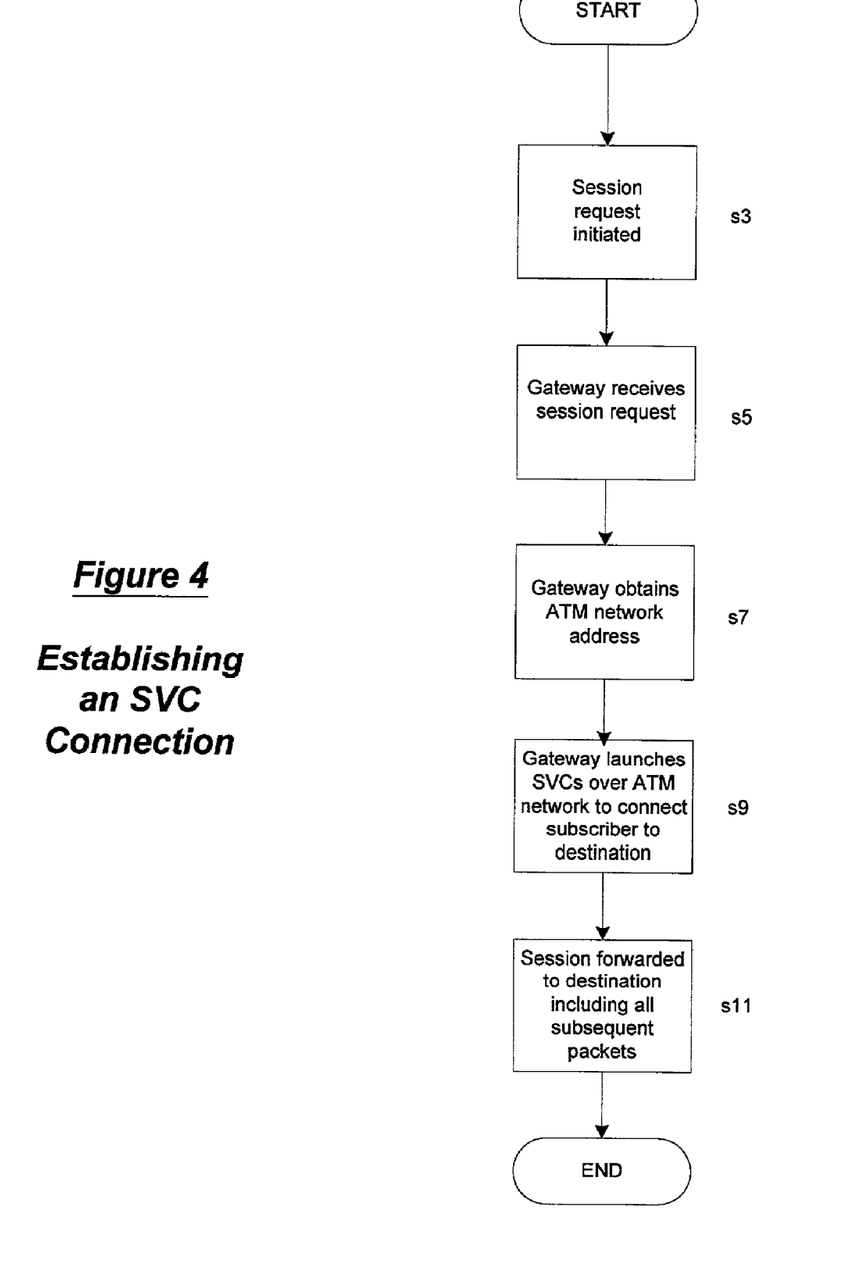
FIG. 4 is a flow diagram showing the process of establishing a virtual private network over asynchronous transfer mode (VPNoATM) according to an aspect of the present invention.

FIG. 4 is a flow diagram showing an exemplary process of establishing an ATM SVC connection 20 (from FIGS. 1 and 2) according to an aspect of the present invention. To request a session, subscriber 2a–c will initially supply destination information required by gateway 12 at s3. In other words, the subscriber sends in a request to talk to destination 16a–c, such as "ISP1.com". Subscriber 2a–c can use a Point-to-Point Protocol (PPP) or a similar protocol to establish sessions with desired destinations 16a–c. The PPP protocol datagrams are then carried over broadband access connection 6 through access multiplexer 4 to gateway 12 at s5

To assist subscriber 2a–c, a selection menu or GUI may be provided for the subscriber to select service provider or destination 16a–c. Various embodiments for the selection menu are available. For instance, an icon may be provided, which upon selection, requests subscriber 2a–c to input a destination address (e.g., "ISP1.com"). At this time, a user ID and password may also be requested. Or the selection menu can be as basic as an icon representative of the actual service provider 16a–c with default parameters already previously defined.

At s5, when gateway 12 receives the request to establish a session from subscriber 2a–c, gateway 12 will then send a query to directory server 14, using a domain name, such as "ISP1.com" as a key into the directory server's database at s7. In response to the query from gateway 12, directory server 14 sends the ATM network address or Network Selection Access Point (NSAP) affiliated with the destination domain name from the request to gateway 12 at s7.

FIG. 3 shows an example of the data in the database located in directory server 14 that can be retrieved by gateway 12. In the case of a PPP session, the destination may be included in a structured user name supplied by the subscriber, such as "user1@ISP1.com". Gateway 12 then maps the destination according to the retrieved ATM network address or NSAP. In particular, the domain part of this name, "ISP1.com", is mapped to the appropriate ATM network address.

Next at s9, gateway 12 launches SVC 20 over ATM network 8 to connect subscriber 2a–c with destination 16a–c. Once the connection is established, the PPP session request and all subsequent packets will be forwarded to destination 16a–c at s11. The database in gateway 12 also associates the subscriber's new session with the aforementioned ATM SVC connection for internal tracking purposes.

b. Terminating the ATM SVC Connection

Figure 7:
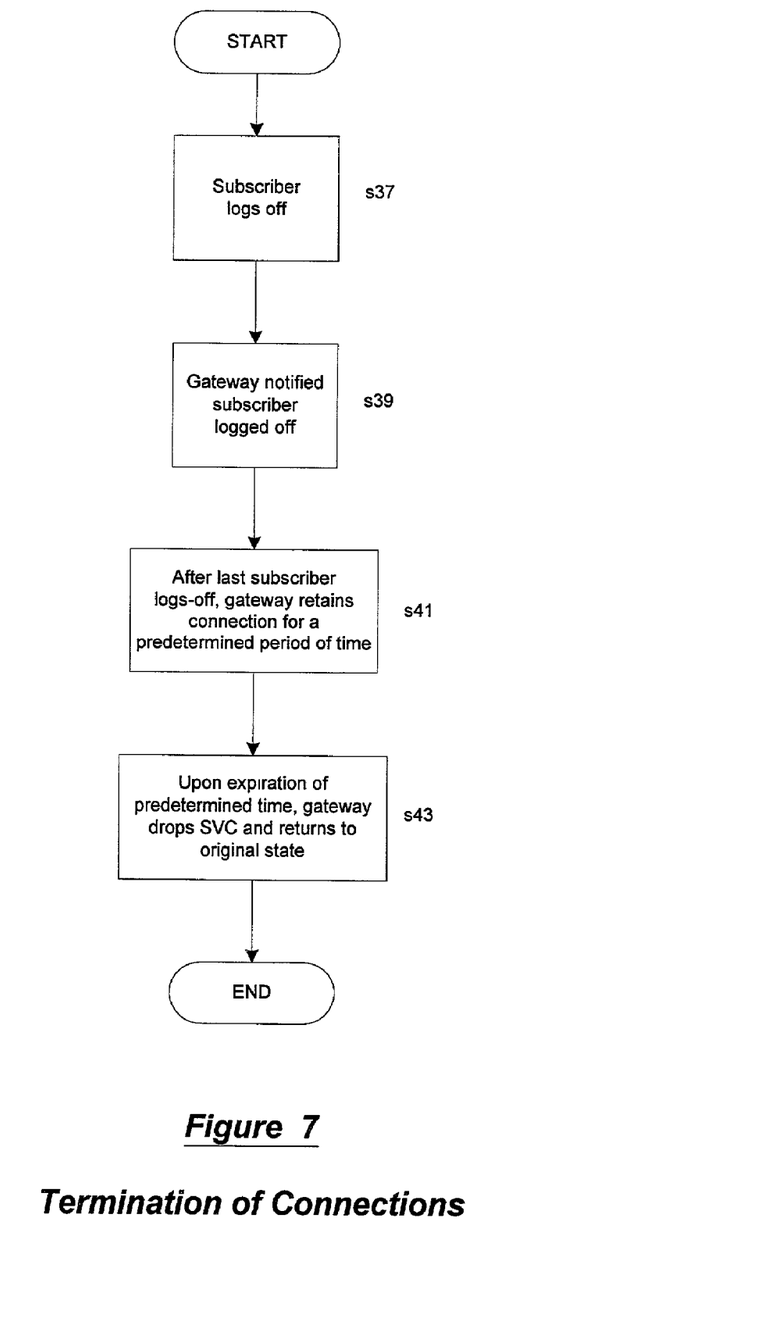
FIG. 7 is a flow diagram showing the process of terminating connections according to an aspect of the present invention.

An exemplary process for terminating ATM SVC connection 20 is shown in FIG. 7. When subscriber 2a–c is finished with the session, subscriber 2a–c can log-off or disconnect from the communications network at s37. At s39, gateway 12 is notified that the subscriber has logged off. For one embodiment of the present invention (not shown), gateway 12 will then immediately disconnect the session. At this point, ATM SVC 20 is torn down, and the system returns to an original state. Note, s41–s43 as depicted in FIG. 7, reflect another embodiment of the present invention which will be explained in further detail below.

c. Multiple Session Feature

It is noted that multiple sessions may be supported by the present invention. For instance, gateway 12 can be configured to provide a plurality of connections for an individual subscriber to a plurality of destinations 16a–c. Thus, for example, it is possible for a subscriber to establish a session with their employer's network, while concurrently having a session established with an ISP.

Multiple sessions are transmitted over ADSL connection 6 (from FIGS. 1 and 2), using point-to-point protocol (PPP) for data transmission. The data is transmitted through the PVC established for each subscriber to service gateway 12. In particular, the ADSL modem receives Ethernet frames from the CPE and inserts them into a single stream of cells, i.e., PVC 18. Each PPP frame has a session identifier, that associates the contents of the frame with a session. Thus, the frames can be sorted and reassembled according to the session identifier. The data is then transmitted over PVC 18, using PPP, to gateway 12. Next, gateway 12 receives the data, reassembles, and processes it according to the session identifier.

An "Exclusive Session" feature may also be provided in conjunction with the multiple sessions feature. For example, some destinations 16a–c might want the subscriber's session to the destination to be the only session active from the subscriber. The "Exclusive Session" feature is particularly suited for computer network security. A security-conscious enterprise might desire this feature to prevent unintended access to their network through the subscriber's CPE 2a–c. In particular, this feature acts to inhibit multiple sessions if desired, since many enterprises with corporate LANs prefer not to allow their home based users to have more than one connection up at a time.

The "Exclusive Session" features operates as follows: Gateway 12 will query directory server 14 to determine if either the existing session or the newly requested session are to destinations that only accept exclusive sessions. If either the existing session or the newly requested session is to a destination that only accepts exclusive sessions, gateway 12 will not allow the newly requested session to be established.

Figure 5:
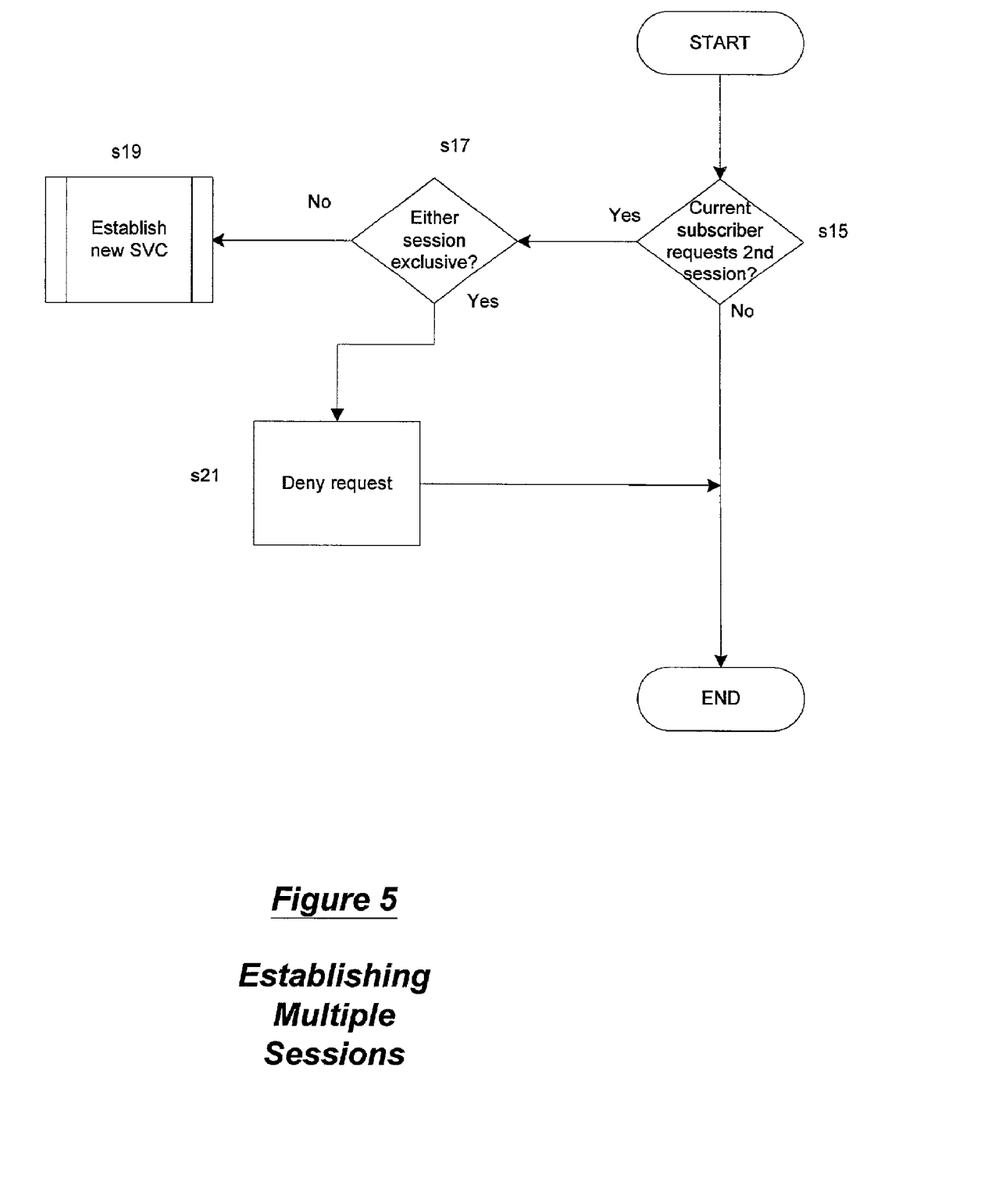
FIG. 5 is a flow diagram showing the process of establishing multiple sessions according to an aspect of the present invention.

An exemplary process for the establishment of multiple sessions is illustrated in FIG. 5. Once a connection is established, for instance to "user1@ISP1.com", gateway 12 transfers data from first subscriber 2a, that is identified as part of first subscriber's session (through the PPP session ID or similar identifier), to "ISP1.com", and vice-versa.

At s15, if it is determined that subscriber 2a requests a session to a second destination (by using, for example "user1@ISP2.com"), gateway 12 will perform a query to directory server 14 at s17 to determine whether the existing or newly requested session is to a destination that accepts only exclusive sessions. If neither session is to a destination that accepts only exclusive sessions, gateway 12 will perform a query for the second destination name and will establish a new ATM SVC connection to the second destination name at s19.

If at s17, either session is to be a destination designated as an "Exclusive Session", the subscriber's request is denied at s21. For instance, if the subscriber is connected to "Enterprise.com" (from FIG. 3), that subscriber would only be able to have a session to "Enterprise.com", and would not be allowed to establish a second session to anywhere else, since the destination "Enterprise.com" has been designated as accepting only exclusive sessions.

d. Connection Sharing Feature

Figure 6:
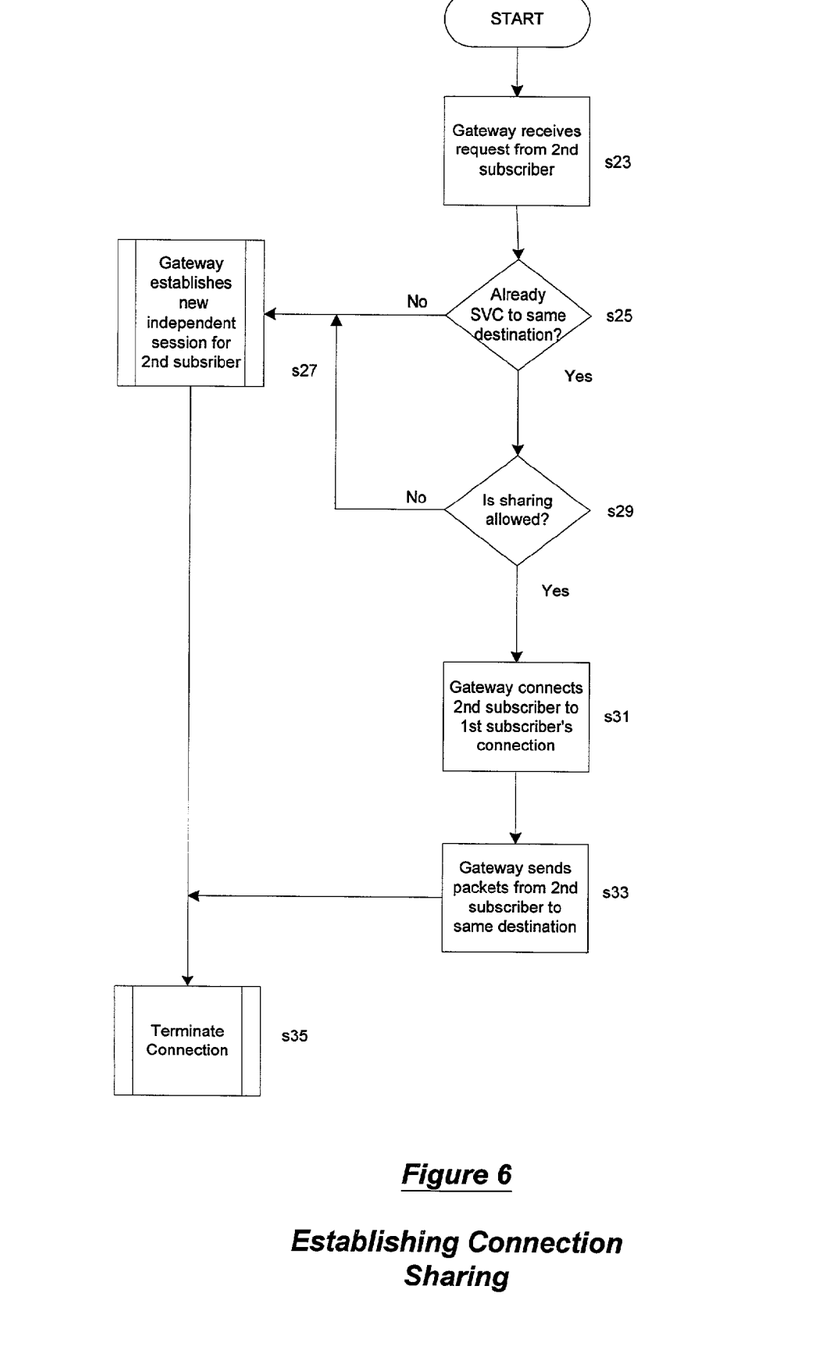
FIG. 6 is a flow diagram showing the process of establishing connection sharing.

Another feature of the present invention is connection sharing. An exemplary process for sharing a connection is illustrated in FIG. 6. In this example, the ATM SVC from service gateway 12 to the "ISP1.com" connection (from FIG. 3), can be shared between subscribers 2a–2c. For instance, at s23 another subscriber 2b–c on the same gateway might also request a connection to the same destination by submitting the structured username "user2@ISP1.com".

At s25, before launching an ATM SVC connection 20, gateway 12 will check its own internal database to see if an ATM SVC connection 20 has already been established to that destination. If an ATM SVC has not already been established to that destination, gateway 12 establishes a new independent session for the second subscriber 2b–c at s27.

If there already has been an ATM SVC connection 20 established to the same destination, then gateway 12 will query directory server 14 to determine whether connection sharing is allowed, at s29. If connection sharing is allowed, gateway 12 connects the second subscriber 2b–c to the first subscriber's2a already established ATM SVC connection at s31. Next, at s33, gateway 12 sends the PPP packets from the second subscriber 2b–c to the first subscriber's destination. For example, in the case of "ISP1.com" from (FIG. 3), the PPP packets from the second subscriber 2b–c are transmitted to the same destination ("ISP1.com") as well at s33. If it is determined at s29 that connection sharing is not allowed, the logic proceeds to s27 and continues as described above.

Two common techniques used for connection sharing employ L2TP and PTA. Both of these techniques are well known and, thus, will not be described here. Other multiplexing techniques may also be used.

e. Retaining ATM SVC Connection Before Termination

When all of the sessions active on an SVC are dropped, gateway 12 will tear down ATM SVC 20 and the system returns to the original state as previously stated. However, another feature of the present invention is for gateway 12 to retain the ATM SVC connection 20 for a predetermined period of time at s41 before it is torn down at s43, as illustrated in FIG. 7. This feature is provided in case either the disconnected subscriber or another subscriber wants access to the same ATM SVC connection 20. Furthermore, this feature increases the overall operational efficiency of the communications network. Eventually, though, all inactive ATM SVCs are torn down. This conserves network resources, as only those connections that are actually in use will have to be carried by the network.

f. Call Flow Diagram

Figure 8:
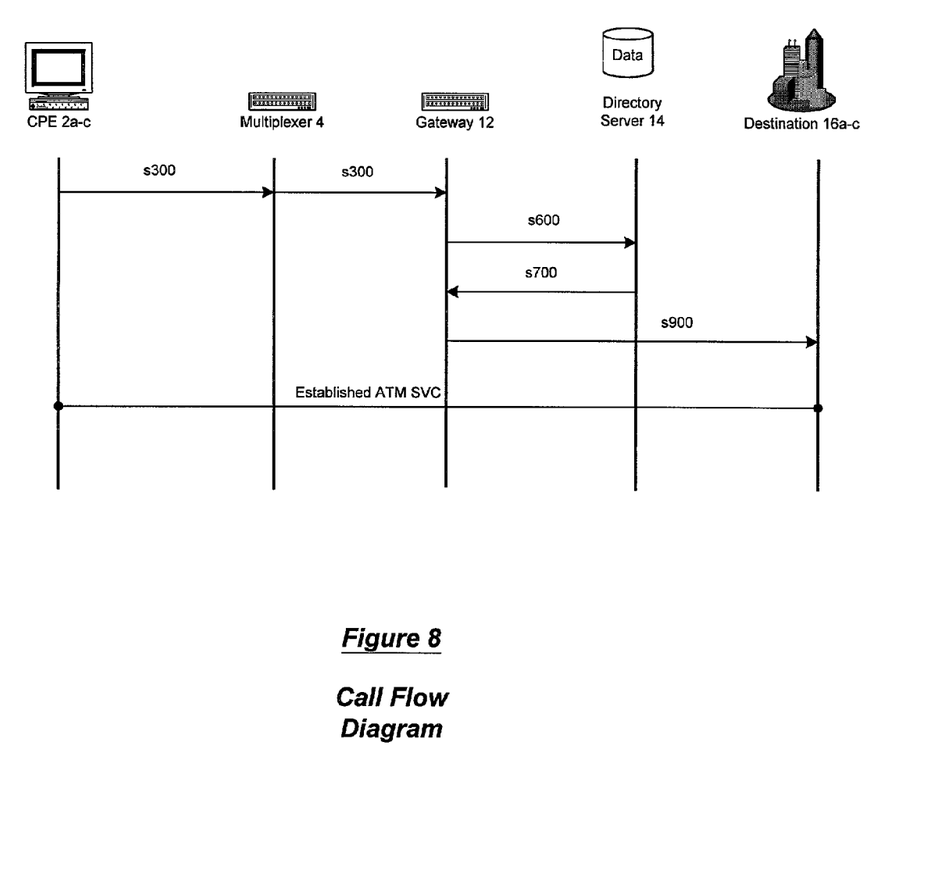
FIG. 8 is a call flow diagram showing the process of establishing a virtual private network over asynchronous transfer mode (VPNOATM) according to an aspect of the present invention.

FIG. 8 is an exemplary call flow diagram showing interaction between the components of the communications network used to establish a virtual private network over asynchronous transfer mode (VPNoATM), according to an aspect of the present invention.

At s300, to request a session, subscriber 2a–c will supply the destination information needed by gateway 12, such as "ISP1.com". The session request is carried over broadband access connection 6 through access multiplexer 4 to gateway 12. Gateway 12 receives the request to establish the session from the subscriber 2a–c via the multiplexer 4. Then, at s600, gateway 12 sends a query to the directory server 14, using the domain name as a key into the directory server's database. At s700, directory server 14, sends the ATM network address affiliated with the destination domain name from the request to gateway 12. Next, gateway 12 maps the destination according to the retrieved ATM network address. Gateway 12 then establishes an ATM SVC 20 over the ATM network 8 to connect to destination 16a–c at s900. Once the call is established, the PPP session request will be forwarded to destination 16a–c as will all subsequent packets.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular components, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to E-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, SHTML, DHTML, XML, PPP, SMTP, MIME), and public telephone networks (ISDN, ATM, ADSL) represent examples of the state of the art. Such standards are periodically superseded by faster or more efficient equivalents having essentially the same functions. Accordingly, replacement standards and protocols having the same functions are considered equivalents.

What is claimed:

1. A method for enabling broadband service subscribers to dynamically access, from subscriber customer premises equipment, broadband service destinations via an ATM network comprising a plurality of ATM switches, the customer premises equipment being connected to at least one service gateway via at least one fiber terminating device, the at least one service gateway being connected to at least one directory server, the method comprising:

receiving a session request, which identifies a selected one of the broadband destinations, in the at least one service gateway, wherein the session request is transmitted over a broadband connection using an Internet protocol;

retrieving, using the at least one service gateway, an ATM network address of the selected broadband destination from the at least one directory server;

launching an SVC over the ATM network from the at least one service gateway to connect the subscriber to the ATM network address; and forwarding the session request and subsequent packets to the selected destination to establish a session over the ATM SVC connection, wherein when the subscriber terminates the session, the at least one service gateway tears down the ATM SVC connection, and wherein the at least one service gateway retains the ATM SVC connection for a predetermined period of time before the ATM SVC connection is torn down.

2. The method according to claim 1, further comprising concurrently establishing multiple sessions for one subscriber using a plurality of ATM SVC connections mapped to a plurality of different destinations.

3. The method according to claim 1, further comprising sharing the ATM SVC connection with a plurality of subscribers such that each subscriber has a session established to the same destination.

4. The method according to claim 3, wherein connection sharing is established by multiplexing each of the plurality of subscribers sessions onto a single SVC connection using one of Layer 2 Tunneling Protocol and PPP Tunnel Aggregation.

5. The method according to claim 1, wherein the at least one directory server is provided with a table which correlates ATM network addresses with domain names.

6. The method according to claim 5, wherein the table further includes a connection sharing protocol for each domain name.

7. The method according to claim 5, wherein the table further indicates whether the session is exclusive for each domain name.

8. The method according to claim 5, wherein the table further includes whether caller I.D., for security purposes, is provided when sessions are established to the destination identified by the domain name.

9. The method according to claim 1, wherein the retrieving further comprises querying the at least one directory server with a domain name, and receiving back the respective ATM network address, connection sharing protocol, data on whether the session is exclusive, and whether caller I.D. for security purposes is provided, for the domain name which has been queried.

10. The method according to claim 1, wherein the at least one service gateway is provided with a database which is updated each time a subscriber logs in and logs out, to internally track existing ATM SVC connections.

11. The method according to claim 1, wherein the at least one service gateway comprises a plurality of service gateways located in different geographical regions.

12. The method according to claim 11, wherein the plurality of service gateways access different directory servers which are loaded with ATM network addresses for different geographical regions, thus preventing service gateways in one region from launching ATM SVCs to destinations in other regions.

13. The method according to claim 1, wherein the at least one fiber terminating device and the at least one broadband service gateway are integrated into one unit.

14. The method according to claim 1, wherein the at least one fiber terminating device comprises one of a multiplexer and a cable television head-end.

15. The method according to claim 1, further comprising establishing a permanent virtual connection between the subscriber customer premise equipment and the at least one service gateway.

16. The method according to claim 1, wherein the Internet protocol comprises point-to-point protocol (PPP).

17. A data communications network for enabling a broadband service subscriber to dynamically select at least one broadband service destination from subscriber customer premises equipment, the communications network comprising:

an ATM network including a plurality of ATM switches;
at least one fiber terminating device;
at least one directory server; and
at least one broadband service gateway connected to the ATM network, the at least one fiber terminating device, and the at least one directory server, the at least one service gateway receiving Internet protocol packets, associated with a session request and transmitted from the customer premises equipment, via the at least one fiber terminating device, the at least one service gateway then launching an ATM SVC connection over the ATM network to connect the subscriber to the at least one broadband service destination in response to the session request from the customer premises equipment, wherein when the subscriber terminates a session, the at least one broadband service gateway tears down the ATM SVC connection, and wherein the at least one service gateway retains the ATM SVC connection for a predetermined period of time before the ATM SVC connection is torn down.

18. The communications network according to claim 17, wherein point-to-point protocol (PPP) is used to transmit data from the customers premise equipment to the at least one service gateway.

19. The communications network according to claim 17, further comprising a permanent virtual connection between the customer premises equipment and the at least one service gateway.

20. The communications network according to claim 17, wherein the at least one service gateway comprises a plurality of gateways located in different geographical regions.

21. The communications network according to claim 20, wherein the plurality of gateways access different directory servers which are loaded with ATM network addresses appropriate for each different geographical region, preventing gateways in one region from launching ATM SVCs to destinations in another region.

22. The communications network according to claim 17, further comprising a permanent virtual connection established between the at least one service gateway and the at least one directory server.

23. The communications network according to claim 17, wherein the at least one fiber terminating device and the at least one broadband service gateway are integrated into one unit.

24. The communications network according to claim 17, wherein the at least one service gateway is provided with a database which internally tracks existing ATM SVC connections.

25. The communications network according to claim 17, further comprising concurrently established multiple sessions for the subscriber using a plurality of ATM SVC connections mapped to a plurality of different destinations.

26. The communications network according to claim 17, further comprising sharing a single ATM SVC connection with a plurality of subscribers such that each subscriber has a unique session established to the same destination.

27. The communications network according to claim 26, wherein connection sharing comprises multiplexing each session into a single SVC connection using one of Layer 2 Tunneling Protocol and PPP Tunnel Aggregation.

28. The communications network according to claim 17, wherein the at least one directory server is provided with a table which correlates ATM network addresses with domain names.

29. The communications network according to claim 28, wherein the table further includes a connection sharing protocol for each domain name.

30. The communications network according to claim 28, wherein the table further indicates whether the session is exclusive for each domain name.

31. The communications network according to claim 17, wherein the at least one broadband service gateway queries the at least one directory server with a domain name, and the at least one service gateway receives back a respective ATM network address, and connection sharing protocol data indicating whether the session is exclusive, for that respective domain name.

32. The communications network according to claim 17, wherein the at least one fiber terminating device comprises one of a multiplexer and cable television head-end.

33. A computer readable medium storing a computer program that enables broadband service subscribers to dynamically access, from subscriber customer premises equipment, broadband service destinations via an ATM network comprising a plurality of ATM switches, the customer premises equipment being connected to at least one service gateway via at least one fiber terminating device, the at least one service gateway being connected to at least one directory server, the computer readable medium comprising:

a code segment that receives a session request, which identifies a selected one of the broadband destinations, in the at least one service gateway, wherein the session request is transmitted over a broadband connection using an Internet protocol;

a code segment that retrieves, using the at least one service gateway, an ATM network address of the selected broadband destination from the at least one directory server;

a code segment that launches an SVC over the ATM network from the at least one service gateway to connect the subscriber to the ATM network address;

a code segment that forwards the session request and subsequent packets to the selected destination to establish a session over the ATM SVC connection, and a tear down code segment that tears down the ATM SVC connection when the subscriber terminates the session, the ATM SVC connection being retained for a predetermined period of time before the ATM SVC connection is torn down.

\* \* \* \* \*